United States Patent
Kompalli et al.

(10) Patent No.: US 9,594,944 B2
(45) Date of Patent: Mar. 14, 2017

(54) METHODS AND SYSTEMS FOR MONITORING A WORKER PERFORMING A CROWDSOURCED TASK

(71) Applicants: Xerox Corporation, Norwalk, CT (US); Palo Alto Research Center Incorporated, Palo Alto, CA (US)

(72) Inventors: Pramod Sankar Kompalli, Rochester, NY (US); Shailesh Vaya, Bangalore (IN); Gregory M Youngblood, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 322 days.

(21) Appl. No.: 14/036,432

(22) Filed: Sep. 25, 2013

(65) Prior Publication Data

US 2015/0086072 A1    Mar. 26, 2015

(51) Int. Cl.
  *G06T 7/20* (2006.01)
  *G06K 9/00* (2006.01)
  *H04N 7/18* (2006.01)
  *G06Q 10/06* (2012.01)

(52) U.S. Cl.
  CPC ..... *G06K 9/00228* (2013.01); *G06K 9/00845* (2013.01); *G06Q 10/06* (2013.01); *H04N 7/183* (2013.01)

(58) Field of Classification Search
  CPC ........... G06K 9/00228; G06K 9/00302; G06K 9/00845; G06T 7/20
  See application file for complete search history.

(56) References Cited

U.S. PATENT DOCUMENTS

| | | | | |
|---|---|---|---|---|
| 2010/0292545 | A1* | 11/2010 | Berka | A61B 5/168 600/301 |
| 2013/0122480 | A1* | 5/2013 | Hanrahan | G09B 5/02 434/322 |
| 2014/0067704 | A1* | 3/2014 | Abhyanker | G06Q 10/1053 705/321 |
| 2014/0321755 | A1* | 10/2014 | Iwamoto | G06K 9/4671 382/197 |
| 2015/0099255 | A1* | 4/2015 | Aslan | G09B 5/08 434/350 |

(Continued)

OTHER PUBLICATIONS

IEEEE Transactions on Pattern Analysis and Machine Intelligence, "Head Pose Estimation in Computer Vision: A Survey", Erik Murphy-Chutorian and Mohan Manubhai Trivedi, digital Object Indentifier 10.1109/TPAMI.2008.106, pp. 1-20.

(Continued)

*Primary Examiner* — Wesley Tucker (57) ABSTRACT

The disclosed embodiments illustrate methods and systems for monitoring a worker performing a crowdsourced task being presented on a computing device. The method comprises performing at least one of a facial detection processing or an eye tracking processing, on a video stream captured by a camera of the computing device. An inattention instance of the worker is determined based on at least one of the facial detection processing or the eye tracking processing. Further, the inattention instance is communicated to a crowdsourcing platform, wherein the crowdsourced task is received from the crowdsourcing platform.

13 Claims, 7 Drawing Sheets

(56) References Cited

U.S. PATENT DOCUMENTS

2015/0313530 A1* 11/2015 Kodra ............... G09B 5/06
                                                                       382/170

OTHER PUBLICATIONS

"In the Eye of the Beholder: A Survey of Models for Eyes and Gaze", Dan Witzner Hansel and Qiang Ji, Jan. 23, 2009, pp. 1-42.
AEGIS Project, "Opengazer: open-source gaze tracker for ordinary webcams", pp. 1-7, 2012.
Second International Workshop on Statistical and computational Theories of Vision—Modeling, Learning, Computing, and Sampling, Vancouver, Canada, Jul. 13, 2001, "Robust Real-time Object Detection", Paul Viola and Michael Jones, pp. 1-25.
$15^{th}$ International Conference on Pattern Recognition (ICPR'00)—vol. 4, "Invariant Face Detection with Support Vector Machines", Barcelona, Spain, Sep. 3-Sep. 8, Jean-Christophe Terrillon et al.
IEEE Xplore Digital Library, "Robust face detection at video frame rate based on edge orientation features", B. Froba et al, pp. 342-347, abstract, 2002.
Pattern Recognition, vol. 45, Issue 9, Sep. 2012, pp. 3304-3316, "Robust face detection using local gradient patterns and evidence accumulation", Bongjin Jun and Daijin Kim.

* cited by examiner

METHODS AND SYSTEMS FOR MONITORING A WORKER PERFORMING A CROWDSOURCED TASK

TECHNICAL FIELD

The presently disclosed embodiments are related, in general, to crowdsourcing. More particularly, the presently disclosed embodiments are related to methods and systems for monitoring a worker performing a crowdsourced task.

BACKGROUND

With the emergence and the growth of crowdsourcing technology, a large number of organizations and individuals are crowdsourcing tasks to workers through crowdsourcing platforms. Some of these tasks may be time-critical and may involve a certain amount of risk if not performed properly. An example of a time-critical task is a video surveillance task. A video surveillance task requires continuous attentiveness on the part of a worker, as even a single instance of a missed suspicious incident may lead to significant business loss. Hence, there is a need to explore a robust solution for the monitoring of crowdworkers while they perform crowdsourced tasks.

SUMMARY

According to embodiments illustrated herein, there is provided a method for monitoring a worker performing a crowdsourced task being presented on a computing device. The method comprises performing at least one of a facial detection processing or an eye tracking processing, on a video stream captured by a camera of the computing device. An inattention instance of the worker is determined based on at least one of the facial detection processing or the eye tracking processing. Further, the inattention instance is communicated to a crowdsourcing platform, wherein the crowdsourced task is received from the crowdsourcing platform.

According to embodiments illustrated herein, there is provided a method for handling an inattention instance of a worker. The method comprises instructing, by one or more processors, a computing device of the worker to suspend a presentation of a crowdsourced task on the computing device, in response to receiving the inattention instance from the computing device. The inattention instance corresponds to at least one of the worker being away from a screen of the computing device, the worker looking away from the screen of the computing device for a predetermined time interval, or an eye-blinking rate of the worker not being within a predetermined range. Thereafter, one or more sample tasks are offered to the worker, in response to suspending the presentation of the crowdsourced task to the computing device. Finally, the crowdsourced task is offered to one or more other workers, in response to one of a non-receipt of responses for the one or more sample tasks within a predetermined time interval, a receipt of incorrect responses for the one or more sample tasks, or the eye-blinking rate of the worker not being within the predetermined range.

According to embodiments illustrated herein, there is provided a system for monitoring a worker performing a crowdsourced task being presented on a computing device. The system comprises a camera and one or more processors. The one or more processors are operable to perform at least one of a facial detection processing or an eye tracking processing, on a video stream captured by the camera of the computing device. An inattention instance of the worker is determined based on at least one of the facial detection processing or the eye tracking processing. Further, the inattention instance is communicated to a crowdsourcing platform, wherein the crowdsourced task is received from the crowdsourcing platform.

According to embodiments illustrated herein, there is provided a system for handling an inattention instance of a worker. The system comprises one or more processors. The one or more processors are operable to instruct a computing device of the worker to suspend a presentation of a crowdsourced task on the computing device, in response to receiving the inattention instance from the computing device. The inattention instance corresponds to at least one of the worker being away from a screen of the computing device, the worker looking away from the screen of the computing device for a predetermined time interval, or an eye-blinking rate of the worker not being within a predetermined range. Thereafter, one or more sample tasks are offered to the worker, in response to suspending the presentation of the crowdsourced task to the computing device of the worker. Finally, the crowdsourced task is offered to one or more other workers, in response to one of a non-receipt of responses for the one or more sample tasks within a predetermined time interval, a receipt of incorrect responses for the one or more sample tasks, or the eye-blinking rate of the worker not being within the predetermined range.

According to embodiments illustrated herein, there is provided a computer program product for use with a computing device. The computer program product comprises a non-transitory computer readable medium, the non-transitory computer readable medium stores a computer program code for monitoring a worker performing a crowdsourced task being presented on the computing device. The computer readable program code is executable by one or more processors in the computing device to perform at least one of a facial detection processing or an eye tracking processing, on a video stream captured by a camera of the computing device. An inattention instance of the worker is determined based on at least one of: the facial detection processing or the eye tracking processing. The inattention instance corresponds to at least one of an absence of the face of the worker in the captured video stream, the worker looking away from a screen of the computing device for a predetermined time interval, or an eye-blinking rate of the worker not being within a predetermined range. Further, the inattention instance is communicated to a crowdsourcing platform, wherein the crowdsourced task is received from the crowdsourcing platform.

According to embodiments illustrated herein, there is provided a computer program product for use with a computing device. The computer program product comprises a non-transitory computer readable medium, the non-transitory computer readable medium stores a computer program code for handling an inattention instance of a worker. The computer readable program code is executable by one or more processors in a first computing device to instruct a computing device of the worker to suspend a presentation of a crowdsourced task on the computing device, in response to receiving the inattention instance from the computing device. The inattention instance corresponds to at least one of the worker being away from a screen of the computing device, the worker looking away from the screen of the computing device for a predetermined time interval, or an eye-blinking rate of the worker not being within a predetermined range. Thereafter, one or more sample tasks are offered to the worker, in response to suspending the presentation of the crowdsourced task to the computing device of the worker. Finally, the crowdsourced task is offered to one or more other workers, in response to one of a non-receipt of responses for the one or more sample tasks within a predetermined time interval, a receipt of incorrect responses for the one or more sample tasks, or the eye-blinking rate of the worker not being within the predetermined range.

BRIEF DESCRIPTION OF DRAWINGS

The accompanying drawings illustrate various embodiments of systems, methods, and other aspects of the disclosure. Any person having ordinary skills in the art will appreciate that the illustrated element boundaries (e.g., boxes, groups of boxes, or other shapes) in the figures represent one example of the boundaries. It may be that in some examples, one element may be designed as multiple elements or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope, and not to limit it in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the respective meanings set forth below.

A "task" refers to a piece of work, an activity, an action, a job, an instruction, or an assignment to be performed. Tasks may necessitate the involvement of one or more workers. Examples of tasks include, but are not limited to, video surveillance, digitizing a document, generating a report, evaluating a document, conducting a survey, writing a code, extracting data, translating text, and the like.

"Crowdsourcing" refers to distributing tasks by soliciting the participation of loosely defined groups of individual crowdworkers. A group of crowdworkers may include, for example, individuals responding to a solicitation posted on a certain website such as, but not limited to, Amazon Mechanical Turk and Crowd Flower.

A "crowdsourcing platform" refers to a business application, wherein a broad, loosely defined external group of people, communities, or organizations provide solutions as outputs for any specific business processes received by the application as input. In an embodiment, the business application may be hosted online on a web portal (e.g., crowdsourcing platform servers). Various examples of the crowdsourcing platforms include, but are not limited to, Amazon Mechanical Turk or Crowd Flower.

A "crowdworker" refers to a workforce/worker(s) that may perform one or more tasks, which generate data that contributes to a defined result. According to the present disclosure, the crowdworker(s) includes, but is not limited to, a satellite center employee, a rural business process outsourcing (BPO) firm employee, a home-based employee, or an internet-based employee. Hereinafter, the terms "crowdworker", "worker", "remote worker", "crowdsourced workforce", and "crowd" may be interchangeably used.

A "sample task" refers to a task that has a predetermined/known response. In an embodiment, a sample task may be presented to a worker to determine an attentiveness of the worker.

A "performance score" refers to a score of a worker on a set of tasks. In an embodiment, the performance score of the worker may be determined as a ratio of a number of correctly attempted sample tasks to total number of attempted sample tasks.

A "video surveillance" refers to closely observing a video footage of a given area/locality/place for monitoring behavior and activities of people in the given area/locality/place and reporting one or more suspicious events occurring in that area/locality/place. The one or more suspicious events may include pilferage, theft, smuggling, damage of property or valuables, eve teasing, crime, or terrorism.

"Facial detection" refers to a technique of determining presence of human faces within an image or a video frame, and determining positions and shapes of the detected human faces.

"Eye tracking" refers to a technique of determining a point of gaze of a person, an eye-blinking rate of the person, and determining eye movements with respect to the person's head. Eye tracking processing may be performed from an image or a video frame that contains a facial region of the person.

An "eye-blinking rate" refers to a rate of blinking of human eyes. In an embodiment, the eye-blinking rate is determined based on an eye tracking processing.

An "inattention instance" refers to an instance when a worker is inattentive while performing a crowdsourced task on a computing device. In an embodiment, the inattention instance corresponds to at least one of the worker being away from a screen of the computing device, the worker looking away from the screen of the computing device for a predetermined time interval, or an eye-blinking rate of the worker not being within a predetermined range.

Figure 1:
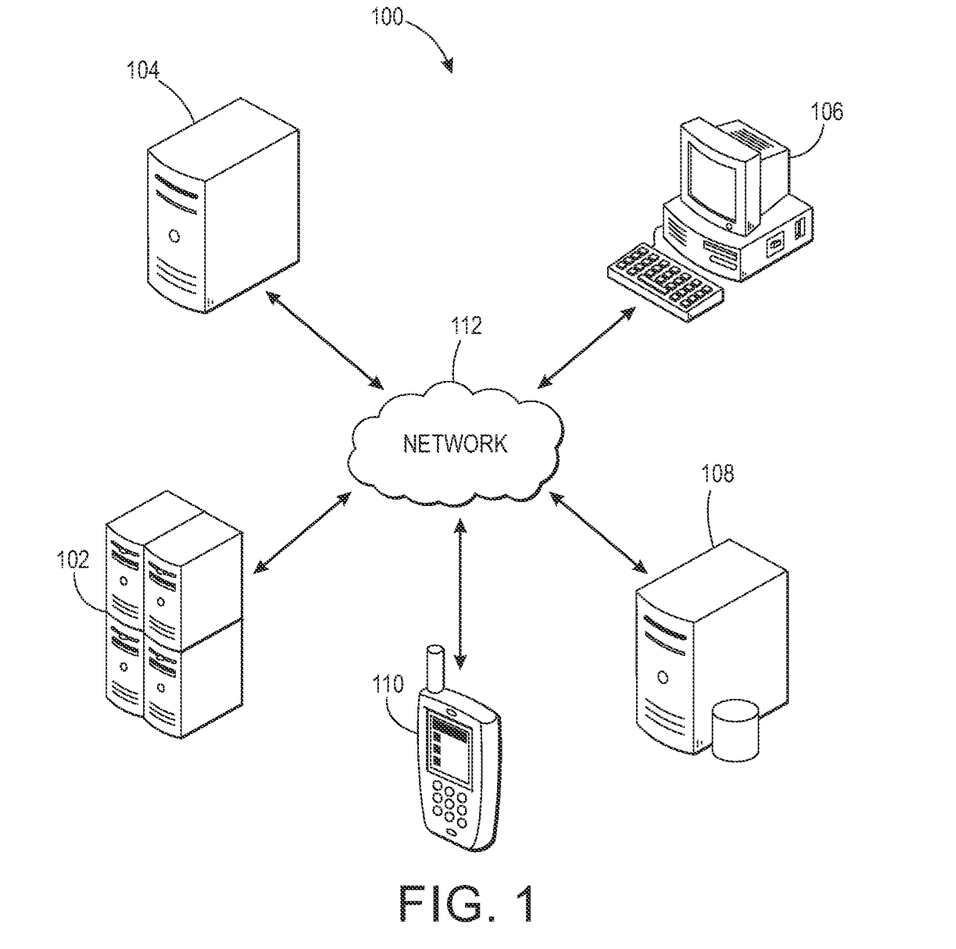
FIG. 1 is a block diagram of a system environment in which various embodiments can be implemented.

FIG. 1 is a block diagram of a system environment 100, in which various embodiments can be implemented. The system environment 100 includes a crowdsourcing platform server 102, an application server 104, a requestor-computing device 106, a database server 108, a worker-computing device 110, and a network 112.

The crowdsourcing platform server 102 is operable to host one or more crowdsourcing platforms. One or more workers are registered with the one or more crowdsourcing platforms. Further, the crowdsourcing platform offers one or more tasks to the one or more workers. In an embodiment, the crowdsourcing platform presents a user interface to the one or more workers through a web-based interface or a client application. The one or more workers may access the one or more tasks through the web-based interface or the client application. Further, the one or more workers may submit a response to the crowdsourcing platform through the user interface.

In an embodiment, the crowdsourcing platform may receive an inattention instance of a worker from the worker-computing device 110. In response to receiving the inattention instance of the worker, the crowdsourcing platform may instruct the worker-computing device 110 to suspend a presentation of the task on the worker-computing device 110. Further, the crowdsourcing platform may offer one or more sample tasks to the worker. If responses to the one or more sample tasks are not received within a predetermined time interval or incorrect responses are received, the crowdsourcing platform may re-assign the task by offering the task to one or more other workers.

In an embodiment, the crowdsourcing platform server 102 may be realized through an application server such as, but not limited to, a Java application server, a .NET framework, and a Base4 application server.

In an embodiment, the application server 104 is operable to generate the one or more tasks for crowdsourcing based on one or more task requests received from the requestor-computing device 106. Further, the application server 104 uploads the one or more generated tasks on the crowdsourcing platform. In an embodiment, the application server 104 receives responses for the one or more crowdsourced tasks from the one or more workers through the crowdsourcing platform. Some examples of the application server 104 may include, but are not limited to, a Java application server, a .NET framework, and a Base4 application server.

A person with ordinary skills in the art would understand that the scope of the disclosure is not limited to illustrating the application server 104 as a separate entity. In an embodiment, the functionality of the application server 104 may be implementable on/integrated with the crowdsourcing platform server 102.

The requestor-computing device 106 is a computing device used by a requestor to send one or more task requests to the application server 104. Examples of the requestor-computing device 106 include, but are not limited to, a personal computer, a laptop, a personal digital assistant (PDA), a mobile device, a tablet, or any other computing device.

The database server 108 stores information associated with the one or more workers. Further, the database server 108 stores information associated with the one or more uploaded tasks. In an embodiment, the database server 108 may receive a query from the crowdsourcing platform server 102 and/or the application server 104 to extract information associated with the one or more workers, or the one or more uploaded tasks. The database server 108 may be realized through various technologies such as, but not limited to, Microsoft® SQL server, Oracle, and My SQL. In an embodiment, the crowdsourcing platform server 102 and/or the application server 104 may connect to the database server 108 using one or more protocols such as, but not limited to, Open Database Connectivity (ODBC) protocol, and Java Database Connectivity (JDBC) protocol.

A person with ordinary skills in the art would understand that the scope of the disclosure is not limited to the database server 108 as a separate entity. In an embodiment, the functionalities of the database server 108 can be integrated into the crowdsourcing platform server 102 and/or the application server 104.

The worker-computing device 110 is a computing device used by a worker. The worker-computing device 110 is operable to present the user interface (received from the crowdsourcing platform) to the worker. The worker receives the one or more crowdsourced tasks from the crowdsourcing platform through the user interface. Thereafter, the worker submits the responses to the crowdsourced tasks through the user interface to the crowdsourcing platform. In an embodiment, the worker-computing device 110 includes an image/video capturing device (e.g., a camera) to capture a video stream of the worker while the worker performs a crowdsourced task from the one or more received crowdsourced tasks. The worker-computing device 110 may perform at least one of a facial detection processing or an eye tracking processing, on the captured video stream of the worker. In an embodiment, the worker-computing device 110 may determine an inattention instance of the worker based on at least one of the facial detection processing or the eye tracking processing. Thereafter, the worker-computing device 110 may communicate the inattention instance to the crowdsourcing platform. The worker-computing device 110 is described later with respect to FIG. 3.

Although, the worker-computing device 110 has been depicted as a mobile device, those skilled in the art would appreciate that the scope of the disclosure is not limited to the worker-computing device 110 being a mobile device. Examples of the worker-computing device 110 include, but are not limited to, a personal computer, a laptop, a mobile device including a mobile phone, a smart-phone, a tablet computer, a PDA or any device that has the capability to display the user interface and capture the video stream of the worker. In an embodiment, the worker-computing device 110 is a mobile device that includes a front-facing camera to capture the video stream of the worker.

The network 112 corresponds to a medium through which content and messages flow between various devices of the system environment 100 (e.g., the crowdsourcing platform server 102, the application server 104, the requestor-computing device 106, the database server 108, and the worker-computing device 110). Examples of the network 112 may include, but are not limited to, a Wireless Fidelity (Wi-Fi) network, a Wireless Area Network (WAN), a Local Area Network (LAN), or a Metropolitan Area Network (MAN).

Various devices in the system environment 100 can connect to the network 112 in accordance with various wired and wireless communication protocols such as Transmission Control Protocol and Internet Protocol (TCP/IP), User Datagram Protocol (UDP), and 2G, 3G, or 4G communication protocols.

Figure 2:
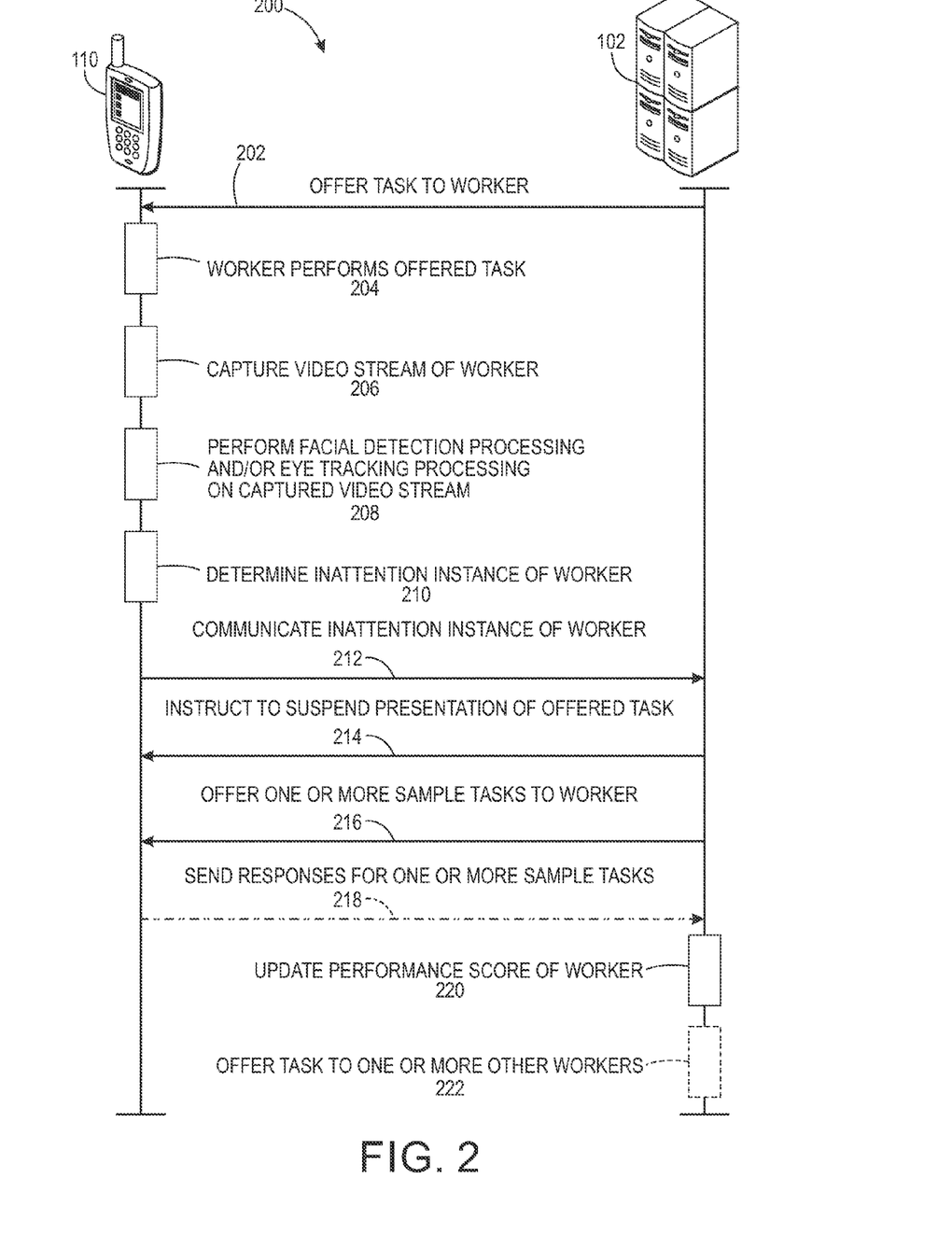
FIG. 2 is an activity diagram illustrating occurrence of events and flow of messages/data between a worker-computing device and a crowdsourcing platform server, in accordance with at least one embodiment.

FIG. 2 is an activity diagram illustrating occurrence of events and flow of messages/data between a worker-computing device 110 and a crowdsourcing platform server 102, in accordance with at least one embodiment.

The crowdsourcing platform server 102 offers a task to the worker-computing device 110 (depicted by 202). If the worker chooses to accept the task, the task is presented on the worker-computing device 110 (not shown in FIG. 2). The worker performs the presented task on the worker-computing device 110 (depicted by 204). While the worker performs the task on the worker-computing device 110, the worker-computing device 110 monitors the worker. To that end, the image/video capturing device of the worker-computing device 110 captures the video stream of the worker (depicted by 206). Subsequently, the worker-computing device 110 performs the facial detection processing and/or the eye tracking processing on the captured video stream (depicted by 208). The worker-computing device 110 determines the inattention instance of the worker based on the facial detection processing and/or the eye tracking processing (depicted by 210), as described later with reference to FIG. 4. Thereafter, the worker-computing device 110 communicates the inattention instance of the worker to the crowdsourcing platform server 102 (depicted by 212).

In response to receiving the inattention instance of the worker from the worker-computing device 110, the crowdsourcing platform server 102 instructs the worker-computing device 110 to suspend the presentation of the offered task on the worker-computing device 110 (depicted by 214). Thereafter, the crowdsourcing platform server 102 offers the one or more sample tasks to the worker (depicted by 216). If the worker chooses to accept the one or more sample tasks, the one or more sample tasks are presented on the worker-computing device 110 (not shown in FIG. 2). Thereafter, in an embodiment, the worker may perform the one or more sample tasks on the worker-computing device 110 (not shown in FIG. 2). Subsequently, the worker-computing device 110 may send the responses for the one or more sample tasks to the crowdsourcing platform server 102 (depicted by 218). In an embodiment, the one or more sample tasks have pre-determined responses that are known to the crowdsourcing platform server 102.

In an embodiment, the crowdsourcing platform server 102 determines whether the responses to the one or more sample tasks are received within a predetermined time interval (not shown in FIG. 2). If it is determined that the responses are received within the predetermined time interval, the crowdsourcing platform server 102 validates the received responses by comparing the received responses to the predetermined responses for the one or more sample tasks. This validation of the received responses for the one or more sample tasks with the predetermined responses is indicative of the performance of the worker on the one or more sample tasks. Thereafter, the crowdsourcing platform server 102 updates the performance score of the worker based on the validation of the received responses for the one or more sample tasks and/or the number of inattention instances of the worker (depicted by 220). Further, in an embodiment, the crowdsourcing platform server 102 may re-assign the task by offering the task to the one or more other workers (depicted by 222). In an embodiment, the crowdsourcing platform server 102 re-assigns the task to one or more other workers if responses to the one or more sample tasks are not received within the predetermined time interval or the received responses to the one or more sample tasks are not determined to be correct based on the validation.

In an embodiment, the crowdsourcing platform server 102 may send a performance report associated with the worker to the worker-computing device 110 at a predetermined time interval (not shown in FIG. 2). The performance report of the worker may include at least one of the number of the inattention instances of the worker, a total time interval during which the worker was inattentive, the performance score of the worker, a number of the crowdsourced tasks performed by the worker, a total time spent by the worker on performing the crowdsourced tasks, and a remuneration receivable by the worker. In an embodiment, the predetermined time interval may be once a year, once a quarter, once a month, once a fortnight, once a week, or once a day, based on a preference of the worker.

Figure 3:
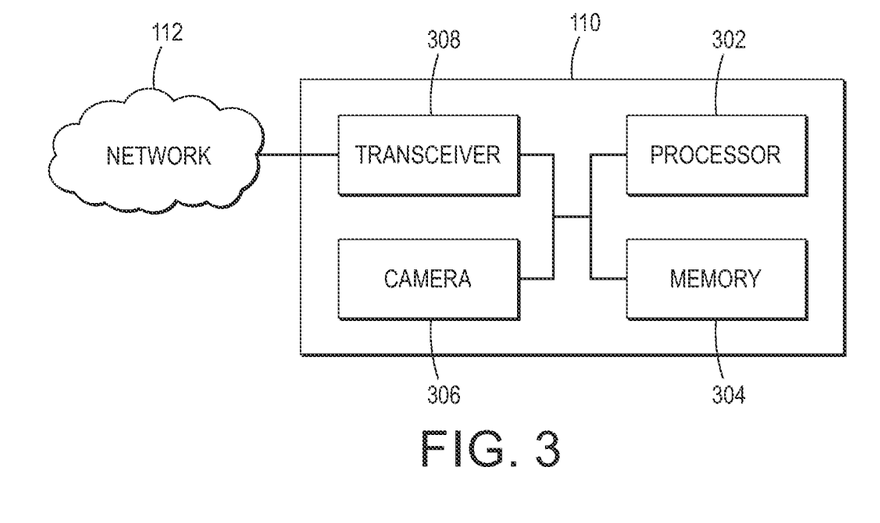
FIG. 3 is a block diagram illustrating a worker-computing device, in accordance with at least one embodiment.

FIG. 3 is a block diagram illustrating the worker-computing device 110, in accordance with at least one embodiment. The worker-computing device 110 includes a processor 302, a memory 304, a camera 306, and a transceiver 308. The processor 302 is coupled to the memory 304, the camera 306, and the transceiver 308. The transceiver 308 is connected to the network 112.

The processor 302 includes suitable logic, circuitry, and/or interfaces that are operable to execute one or more instructions stored in the memory 304 to perform predetermined operations. The memory 304 may be operable to store the one or more instructions. The processor 302 may be implemented using one or more processor technologies known in the art. Examples of the processor 302 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 304 stores a set of instructions and data. Some of the commonly known memory implementations include, but are not limited to, a random access memory (RAM), a read only memory (ROM), a hard disk drive (HDD), and a secure digital (SD) card. Further, the memory 304 includes the one or more instructions that are executable by the processor 302 to perform specific operations. It is apparent to a person having ordinary skills in the art that the one or more instructions stored in the memory 304 enable the hardware of the worker-computing device 110 to perform the predetermined operations.

The camera 306 captures the video stream of the worker while the worker performs the crowdsourced task on the worker-computing device 110. In an embodiment, the camera 306 may be in-built into the worker-computing device 110. In an alternate embodiment, the camera 306 may be external to the worker-computing device 110 and communicatively coupled to the worker-computing device 110 through any wired or wireless connection. A wired connection may include, but is not limited to, a Universal Serial Bus (USB) cable, a High-Definition Multimedia Interface (HDMI) cable or any other wired connection. A wireless connection may include, but is not limited to, Bluetooth, Wireless LAN (WLAN), Wireless Personal Area Network (WPAN), or any other wireless connection. The camera 306 may be implemented using one or more image sensing technologies known in the art such as, but not limited to, a Charge-Coupled Device (CCD) based image sensor and a Complementary Metal Oxide Semi-conductor (CMOS) based image sensor.

The transceiver 308 transmits and receives messages and data to/from various components of the system environment 100 (e.g., the crowdsourcing platform server 102, the application server 104, the requestor-computing device 106, and the database server 108) over the network 112. Examples of the transceiver 308 may include, but are not limited to, an antenna, an Ethernet port, a USB port, or any other port that can be configured to receive and transmit data. The transceiver 308 transmits and receives data/messages in accordance with the various communication protocols, such as, TCP/IP, UDP, and 2G, 3G, or 4G communication protocols.

Figure 4:
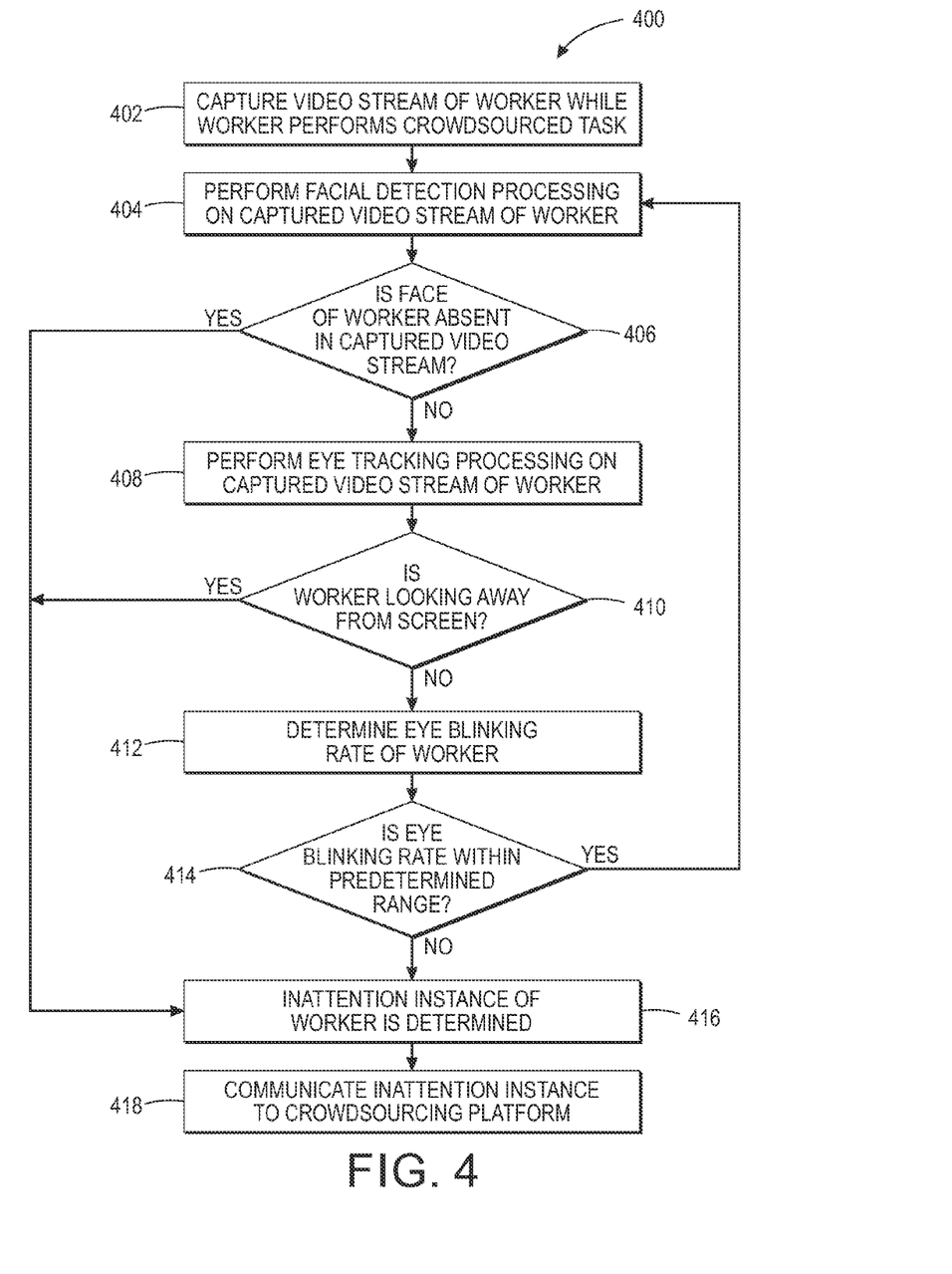
FIG. 4 is a flowchart illustrating a method for monitoring a worker while the worker is performing a crowdsourced task, in accordance with at least one embodiment.

The operation of the worker-computing device 110 for monitoring the worker while the worker is performing the crowdsourced task on the worker-computing device 110 has been described in conjunction with FIG. 4.

FIG. 4 is a flowchart 400 illustrating a method for monitoring the worker while the worker is performing the crowdsourced task, in accordance with at least one embodiment. The flowchart 400 is described in conjunction with FIG. 1 and FIG. 3.

At step 402, the video stream of the worker is captured while the worker performs the crowdsourced task. In an embodiment, the camera 306 captures the video stream of the worker. The camera 306 continues capturing the video stream of the worker while the worker continues performing the crowdsourced task and the camera 306 stops capturing the video stream when the worker finishes performing the crowdsourced task or when the worker pauses for a break. In an embodiment, a worker is said to be performing a task if the worker is responsive to one or more instructions of the task, for e.g., an instruction to provide a user input at a pre-determined time, etc.

At step 404, the facial detection processing is performed from the captured video stream of the worker. In an embodiment, the processor 302 is operable to perform the facial detection processing from the captured video stream of the worker. In an embodiment, the facial detection processing may be performed using any pattern detection or object detection techniques known in the art such as, but not limited to, Viola-Jones object detection framework, invariant face detection with support vector machines, robust face detection at video frame rate based on edge orientation features, robust face detection using local gradient patterns and evidence accumulation, Scale Invariant Feature Transform (SIFT), template based feature detection, regressive feature classification, and/or any machine learning technique such as, but not limited to, neural networks, radial basis functions, support vector machines (SVM), Naïve Bayes, or k-nearest neighbor algorithm.

At step 406, a check is performed to determine whether the face of the worker is absent in the captured video stream. In an embodiment, the processor 302 is operable to determine whether the face of the worker is absent in the captured video stream, based on the facial detection processing performed on the captured video stream. If it is determined that the face of the worker is absent in the captured video stream, step 416 is performed. However, if it is determined that the face of the worker is present in the captured video stream, step 408 is performed.

At step 408, the eye tracking processing is performed on the captured video stream of the worker. In an embodiment, the processor 302 is operable to perform the eye tracking processing from the captured video stream of the worker. In an embodiment, the eye tracking processing may be performed using any technique known in the art such as, but not limited to, shape-based eye detection, feature-based eye detection, template-based eye detection, hybrid eye detection models, feature-based gaze estimation, regression-based gaze estimation, template-based head pose estimation, regression-based head pose estimation, and/or any machine learning technique such as, but not limited to, neural networks, radial basis functions, support vector machines (SVM), Naïve Bayes, or k-nearest neighbor algorithm.

At step 410, a check is performed to determine whether the worker is looking away from a screen of the worker-computing device 110. In an embodiment, the processor 302 is operable to determine whether the worker is looking away from the screen of the worker-computing device 110, based on the eye tracking processing performed on the captured video stream. If it is determined that the worker is looking away from the screen for a predetermined time interval, step 416 is performed. However, if it is determined that the worker is looking towards the screen, step 412 is performed.

At step 412, the eye-blinking rate of the worker is determined. In an embodiment, the processor 302 is operable to determine the eye-blinking rate of the worker, based on the eye tracking processing performed from the captured video stream. The eye-blinking rate determination may be useful in a scenario where a worker is not actually present in front of the worker-computing device 110, but the worker places an image of himself/herself in front of the camera 306. Since the eyes of the worker would not be blinking in the image, the eye-blinking rate determination can effectively catch instances of such deceptions by the worker.

At step 414, a check is performed to determine whether the eye-blinking rate of the worker is within a predetermined range. In an embodiment, the processor 302 is operable to determine whether the eye-blinking rate of the worker is within the predetermined range. As mentioned above, this check would catch those instances of deception by the worker when the worker is not physically present in front of the worker-computing device 110; however, an image of the worker is placed in front of the camera 306. If it is determined that the eye-blinking rate of the worker is within the predetermined range, then the worker is indeed physically present and attentive towards the crowdsourced task. In such a scenario, the processor 302 continues to monitor the worker by performing facial detection from the video stream of the worker being captured by the camera 306 (step 404). However, if it is determined that the eye-blinking rate of the worker is not within the predetermined range, step 416 is performed.

At step 416, the inattention instance of the worker is determined. In an embodiment, the processor 302 is operable to determine the inattention instance of the worker, based on at least one of the facial detection processing (step 404) or the eye tracking processing (step 408) performed from the captured video stream.

At step 418, the inattention instance of the worker is communicated to the crowdsourcing platform. In an embodiment, the processor 302 is operable to communicate the inattention instance of the worker to the crowdsourcing platform through the transceiver 308.

In an embodiment, the processor 302 sends a notification of the inattention instance to the crowdsourcing platform. The notification may include an indication of a time interval spent by the worker on performing the crowdsourced task excluding those time instances when the worker was inattentive. In an embodiment, the crowdsourcing platform may remunerate the worker for performing the crowdsourced task based on the time interval.

In an embodiment, the processor 302 may also send a representative video frame from the captured video stream as a proof of the inattention instance to the crowdsourcing platform. In an embodiment, the communication of the inattention instance of the worker to the crowdsourcing platform is based on terms and conditions of a privacy agreement between the worker and the crowdsourcing platform. For example, the processor 302 sends the representative video frame to the crowdsourcing platform if such a communication mode is acceptable to the worker as per the privacy agreement.

Figure 5:
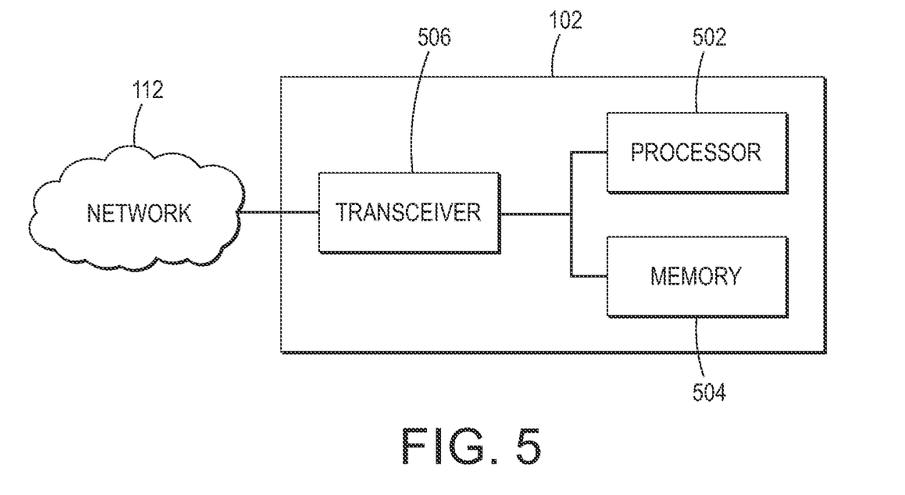
FIG. 5 is a block diagram illustrating a crowdsourcing platform server, in accordance with at least one embodiment.

FIG. 5 is a block diagram illustrating the crowdsourcing platform server 102, in accordance with at least one embodiment. The crowdsourcing platform server 102 includes a processor 502, a memory 504, and a transceiver 506. The processor 502 is coupled to the memory 504, and the transceiver 506. The transceiver 506 is connected to the network 112.

The processor 502 includes suitable logic, circuitry, and/or interfaces that are operable to execute one or more instructions stored in the memory 504 to perform predetermined operations. The memory 504 may be operable to store the one or more instructions. The processor 502 may be implemented using one or more processor technologies known in the art. Examples of the processor 502 include, but are not limited to, an x86 processor, an ARM processor, a RISC processor, an ASIC processor, a CISC processor, or any other processor.

The memory 504 stores a set of instructions and data. Some of the commonly known memory implementations include, but are not limited to, a RAM, a ROM, a HDD, and a SD card. Further, the memory 504 includes the one or more instructions that are executable by the processor 502 to perform specific operations. It is apparent to a person with ordinary skills in the art that the one or more instructions stored in the memory 504 enable the hardware of the crowdsourcing platform server 102 to perform the predetermined operations.

The transceiver 506 transmits and receives messages and data to/from various components of the system environment 100 (e.g., the application server 104, the requestor-computing device 106, the database server 108, and the worker-computing device 110) over the network 112. Examples of the transceiver 506 may include, but are not limited to, an antenna, an Ethernet port, a USB port, or any other port that can be configured to receive and transmit data. The transceiver 506 transmits and receives data/messages in accordance with the various communication protocols, such as, TCP/IP, UDP, and 2G, 3G, or 4G communication protocols.

Figure 6:
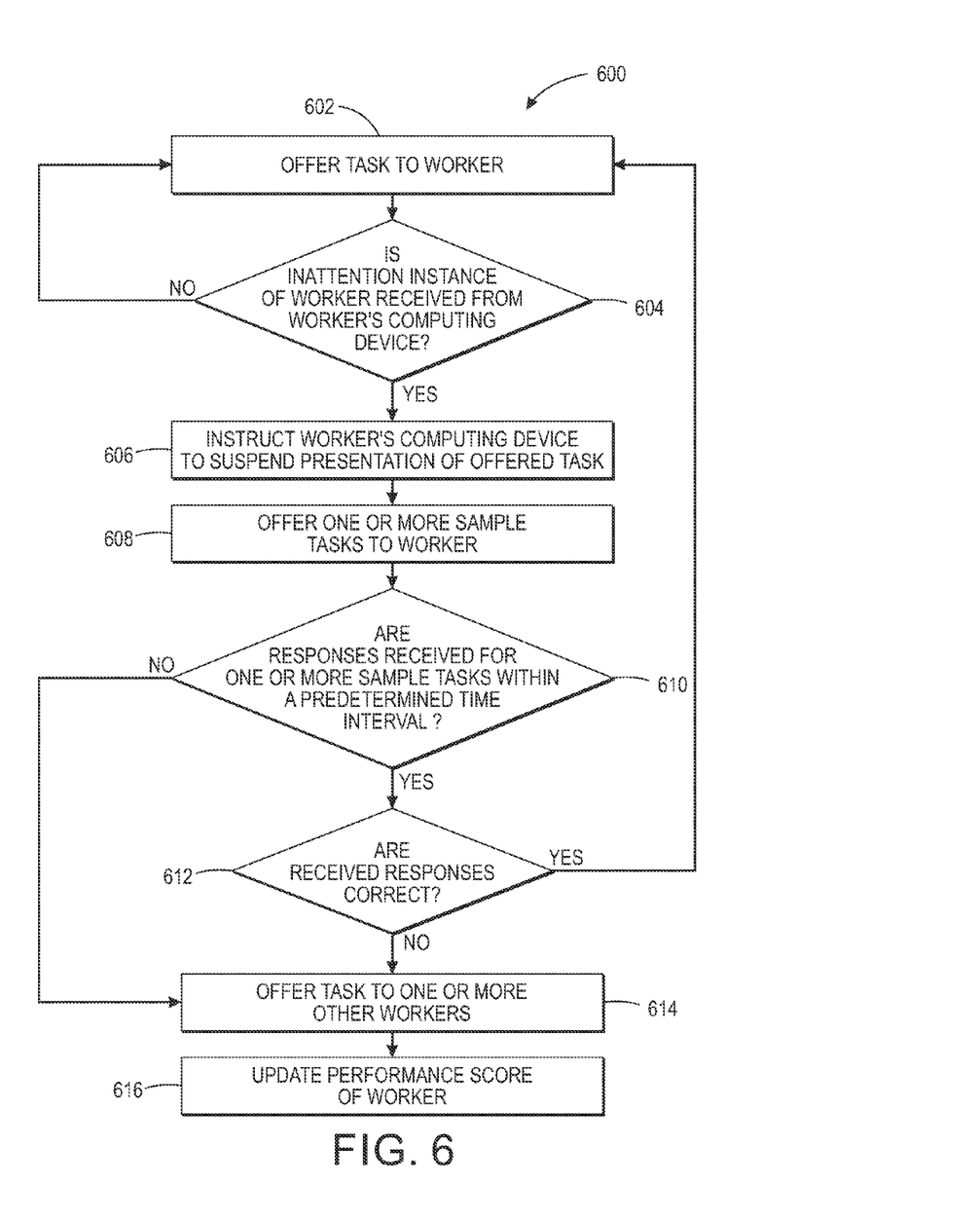
FIG. 6 is a flowchart illustrating a method for handling an inattention instance of a worker, in accordance with at least one embodiment.

The operation of the crowdsourcing platform server 102 for handling the inattention instance of the worker has been described in conjunction with FIG. 6.

FIG. 6 is a flowchart 600 illustrating a method for handling the inattention instance of the worker, in accordance with at least one embodiment. The flowchart 600 is described in conjunction with FIG. 1, and FIG. 5.

At step 602, the task is offered to the worker. In an embodiment, the processor 502 offers the task to the worker by sending the task to the worker-computing device 110 through the transceiver 506. If the worker chooses to accept the task, the task is presented to the worker on the worker-computing device 110. Thereafter, the worker-computing device 110 monitors the worker while the worker performs the task on the worker-computing device 110, as explained with reference to FIG. 4.

At step 604, a check is performed to determine whether the inattention instance of the worker is received from the worker-computing device 110. In an embodiment, the processor 502 determines whether the inattention instance of the worker is received from the worker-computing device 110. If it is determined that the inattention instance of the worker is received from the worker-computing device 110, step 606 is performed. If the inattention instance of the worker is not received from the worker-computing device 110, the processor 502 offers another task to the worker when the worker completes performing the current task (step 602).

At step 606, the worker-computing device 110 is instructed to suspend the presentation of the offered task on the worker-computing device 110. The processor 502 instructs the worker-computing device 110 to suspend the presentation of the offered task on the worker-computing device 110.

At step 608, the one or more sample tasks are offered to the worker. In an embodiment, the processor 502 offers the one or more sample tasks to the worker by sending the one or more sample tasks to the worker-computing device 110 through the transceiver 506. If the worker chooses to accept the one or more sample tasks, the one or more sample tasks are presented on the worker-computing device 110.

At step 610, a check is performed to determine whether responses for the one or more sample tasks are received from the worker within a predetermined time interval. In an embodiment, the processor 502 determines whether the responses are received within the predetermined time interval. If it is determined that the responses are received within the predetermined time interval, step 612 is performed, and otherwise, step 614 is performed.

At step 612, a check is performed to determine whether responses for the one or more sample tasks are correct. In an embodiment, the processor 502 determines whether the received responses are correct by validating the received responses with the predetermined responses for the one or more sample tasks. The validation of the received responses with the predetermined responses is indicative of the performance of the worker. If it is determined that the responses are incorrect based on the validation, step 614 is performed, otherwise step 602 is performed.

At step 614, the task is offered to the one or more other workers. In an embodiment, the processor 502 re-assigns the task by offering the task to the one or more other workers.

At step 616, a performance score of the worker is updated. In an embodiment, the processor 502 updates the performance score of the worker, based on the validation of the received responses for the one or more sample tasks and/or the number of inattention instances of the worker.

A person skilled in the art would appreciate that the scope of the disclosure should not be limited with respect to the handling of the inattention instance of the worker as explained above. The handling of the inattention instance of the worker may be implemented with one or more variations without departing from the spirit of the disclosure.

For example, the task may be a video surveillance task. In an embodiment, the video surveillance task may include one or more Uniform Resource Locators (URLs) indicative of a web location from which the video footage associated with the video surveillance task may be obtained by the worker-computing device 110. The video surveillance task may be associated with a real-time video footage or a non real-time video footage.

When the video surveillance task is to be offered to the worker, the crowdsourcing platform may retrieve the video surveillance task from the database server 108 and send the retrieved video surveillance task to the worker-computing device 110. Thereafter, if the worker chooses to accept the video surveillance task, the worker-computing device 110 may obtain the video footage associated with the video surveillance task from the web location and present the video surveillance task on the worker-computing device 110. Alternatively, the worker-computing device may obtain the video footage from the crowdsourcing platform. The worker-computing device 110 may monitor the worker while the worker performs the video surveillance task on the worker-computing device 110, as explained with reference to FIG. 4.

When the inattention instance of the worker is determined by the worker-computing device 110 and communicated to the crowdsourcing platform, the crowdsourcing platform may instruct the worker-computing device 110 to suspend the presentation of the video surveillance task on the worker-computing device 110. To that end, the crowdsourcing platform may stop streaming the video footage associated with the video surveillance task to the worker-computing device 110. Alternatively, the video footage may be temporarily paused on the worker-computing device 110. In the meanwhile, the crowdsourcing platform may continue to stream the video footage to the worker-computing device 110, while the worker-computing device 110 may buffer the streamed video footage.

After the presentation of the video surveillance task is suspended on the worker-computing device 110, the crowdsourcing platform may offer one or more sample video surveillance tasks to the worker. Video footages associated with the one or more sample video surveillance tasks may include one or more predetermined instances of suspicious events such as, but not limited to, pilferage, theft, smuggling, damage of property or valuables, eve teasing, crime, or terrorism. Accordingly, the one or more sample video surveillance tasks may have predetermined responses that are known to the crowdsourcing platform. If the worker fails to respond to the one or more sample video surveillance tasks within a predetermined time interval or the worker fails to identify the one or more predetermined instances of the suspicious events in the video footages, the crowdsourcing platform may re-assign the video surveillance task by offering the video surveillance task to the one or more other workers. The performance of the worker on the one or more sample tasks may be determined by the crowdsourcing platform by validating the received responses with the predetermined responses. Finally, the crowdsourcing platform may update the performance score of the worker based on the validation of the received responses for the one or more sample video surveillance tasks and/or the number of inattention instances of the worker.

Figure 7:
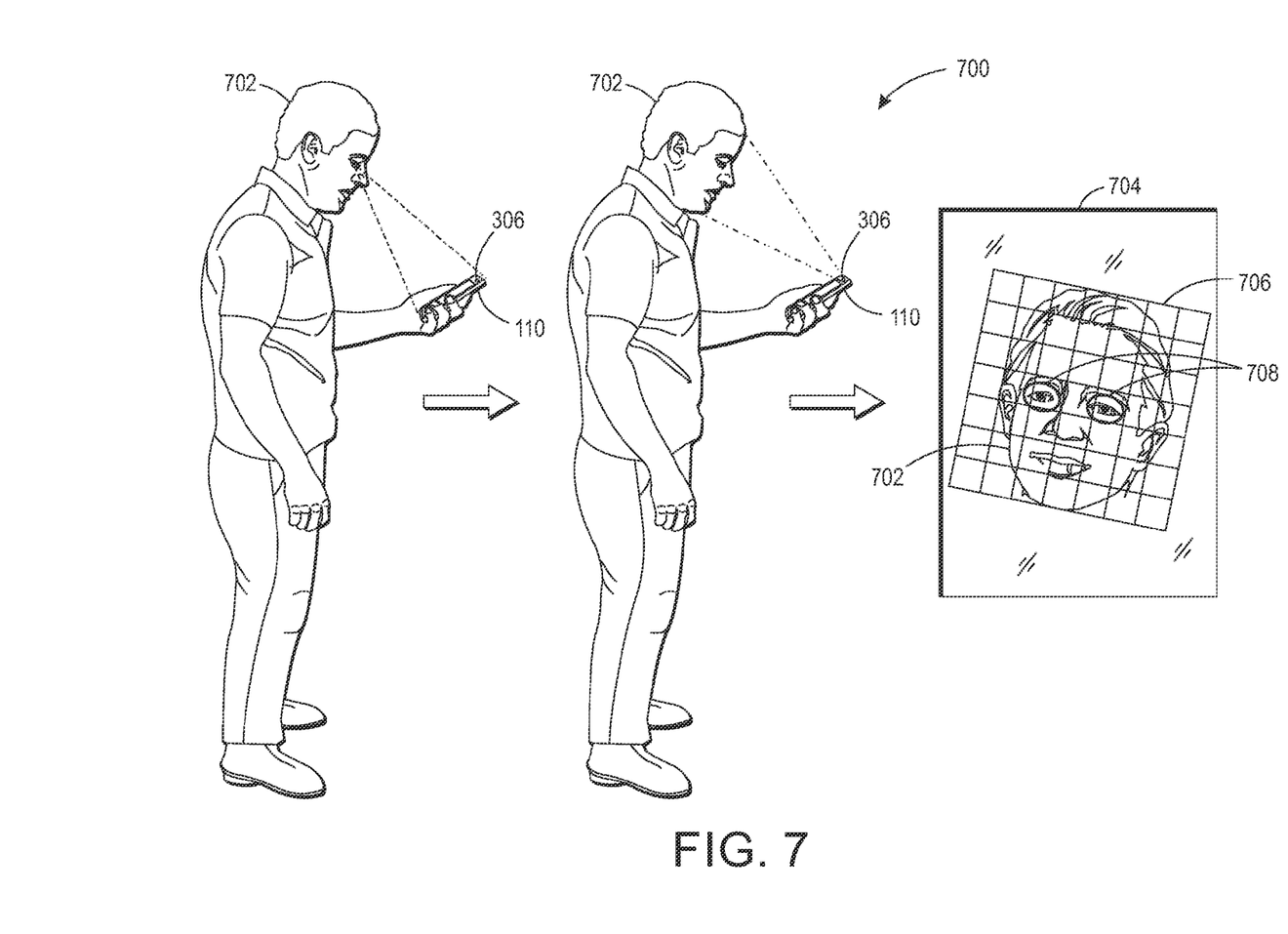
FIG. 7 depicts an example scenario in which inattention instance of a worker is determined using facial detection processing and/or eye tracking processing, in accordance with at least one embodiment.

FIG. 7 depicts an example scenario 700 in which the inattention instance of the worker is determined using the facial detection processing and/or the eye tracking processing, in accordance with at least one embodiment.

As shown in FIG. 7, the worker 702 looks towards the screen of the worker-computing device 110 while performing the crowdsourced task. Thereafter, the camera 306 of the worker-computing device 110 monitors the worker 702 while the worker 702 performs the crowdsourced task. In an embodiment, the camera 306 captures the video stream of the worker to monitor the worker 702. Further, FIG. 7 depicts a region of interest 704 in a representative frame of the captured video stream from which the facial detection processing and/or eye tracking processing is performed. In an embodiment, the region of interest 704 contains the face of the worker 702. A graphical overlay 706 on the face of the worker 702 is representative of a facial region detected by the worker-computing device 110 within the region of interest 704. A pair of elliptical overlays 708 encircling the eyes of the worker 702 is representative of a set of regions used for eye tracking by the worker-computing device 110 within the region of interest 704. The determination of the inattention instance of the worker 702 is based on at least one of the facial detection processing or the eye tracking processing, as is explained with reference to FIG. 4.

A person skilled in the art would appreciate that the scope of the disclosure should not be limited to the example scenario 700, as described above. The disclosure may be implemented with one or more variations without departing from the spirit of the disclosure.

The disclosed embodiments encompass numerous advantages. Various embodiments of the disclosure lead to increased efficiency in the monitoring of a worker performing a crowdsourced task on a worker-computing device 110. A video stream of the worker is captured while the worker performs the crowdsourced task. Whether the worker is inattentive (i.e., an inattention instance of the worker) while performing the crowdsourced task is determined based on a facial detection processing and/or an eye tracking processing performed from the captured video stream of the worker. If the face of the worker is not detected from the captured video stream based on the facial detection processing, the inattention instance of the worker is detected straight away. In such a scenario, the eye tracking processing need not be performed by the worker-computing device 110, thereby conserving power of the worker-computing device 110. However, if the face of the worker is detected based on the facial detection processing, the eye tracking processing is performed from the captured video stream by the worker-computing device 110. An eye gaze and an eye-blinking rate of the worker are determined based on the eye tracking processing, thereby providing a robust check of worker attentiveness. When the worker is looking away from the screen of the worker-computing device 110 for a predetermined time interval and/or the eye-blinking rate of the worker is not within a predetermined range, the inattention instance of the worker is determined based on the eye tracking processing. The eye-blinking rate determination can effectively catch instances of deception by the worker when a cutout image of the worker is placed in front of the worker-computing device 110, as the eyes of the worker would not blink in the cutout image.

In addition, as described in reference to FIG. 4, when the inattention instance of the worker is received by the crowdsourcing platform, one or more sample tasks may be offered to the worker by the crowdsourcing platform. Thus, instead of offering the one or more sample tasks at a random or a predetermined time interval, the crowdsourcing platform may offer the one or more sample tasks when the inattention instance of the worker is determined. The one or more sample tasks may act as a further check for validating the inattentiveness of the worker.

The privacy concerns of a worker are effectively addressed by the disclosure as the facial detection processing and the eye tracking processing are performed on the worker-computing device 110 itself. The worker-computing device 110 does not have to send the captured video stream of the worker to the crowdsourcing platform. When the inattention instance of the worker is determined, the worker-computing device 110 may send a notification indicative of the inattention instance to the crowdsourcing platform, instead of sending the captured video stream. Additionally, the communication of the inattention instance of the worker by the worker-computing device 110 to the crowdsourcing platform may be governed by the terms and conditions of a privacy agreement between the worker and the crowdsourcing platform.

The disclosed embodiments would be advantageous for ensuring adherence to quality and service level agreement (SLA) requirements for time critical tasks by monitoring the inattentiveness of the worker. Worker monitoring would be particularly useful for tasks such as video surveillance tasks where the presence and the attentiveness of a worker are important for the successful performance of the task. If a worker is found to be inattentive while performing a task, the crowdsourcing platform may re-assign the task to one or more other workers, thereby ensuring quality and meeting the SLA requirements of the task.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions that is stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for monitoring a worker performing a crowdsourced task have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, and the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for monitoring a worker performing a crowdsourced task being presented on a computing device, the method comprising:

performing, by one or more processors in the computing device, at least one of a facial detection processing or an eye tracking processing, on a video stream captured by a camera of the computing device;

determining, by the one or more processors, an inattention instance of the worker, based on at least one of the facial detection processing or the eye tracking processing;

communicating, by the one or more processors, the determined inattention instance to a crowdsourcing platform to receive an instruction from the crowdsourcing platform for suspension of the crowdsourced task being presented on the computing device, wherein the crowdsourced task is received from the crowdsourcing platform; and communicating, by the one or more processors, one or more responses to the crowdsourcing platform within a predetermined time interval for one or more sample tasks received from the crowdsourcing platform in an event of the suspension of the crowdsourced task, wherein a performance score of the worker is updated by the crowdsourcing platform based on a count of inattention instances and validation of the one or more responses provided by the worker.

2. The method of claim 1, wherein the crowdsourced task is a video surveillance task.

3. The method of claim 1, wherein the inattention instance corresponds to at least one of an absence of the face of the worker in the captured video stream, the worker looking away from a screen of the computing device for a predetermined time interval, or an eye-blinking rate of the worker not being within a predetermined range.

4. The method of claim 1, wherein the computing device is one of a mobile phone, a smart-phone, a tablet computer, a Personal Digital Assistant (PDA), or any other mobile device, and wherein the camera is a front-facing camera of the computing device.

5. A system for monitoring a worker performing a crowdsourced task being presented on a computing device, the system comprising:
a camera; and
one or more processors in the computing device operable to:
perform at least one of a facial detection processing or an eye tracking processing on a video stream captured by the camera of the computing device;
determine an inattention instance of the worker, based on at least one of the facial detection processing or the eye tracking processing;
communicate the determined inattention instance to a crowdsourcing platform to receive an instruction from the crowdsourcing platform for suspension of the crowdsourced task being presented on the computing device, wherein the crowdsourced task is received from the crowdsourcing platform; and
communicate one or more responses to the crowdsourcing platform within a predetermined time interval for one or more sample tasks received from the crowdsourcing platform in an event of the suspension of the crowdsourced task, wherein a performance score of the worker is updated by the crowdsourcing platform based on a count of inattention instances and validation of the one or more responses provided by the worker with predetermined responses.

6. The system of claim 5, wherein the crowdsourced task is a video surveillance task.

7. The system of claim 5, wherein the inattention instance corresponds to at least one of an absence of the face of the worker in the captured video stream, the worker looking away from a screen of the computing device for a predetermined time interval, or an eye-blinking rate of the worker not being within a predetermined range.

8. The system of claim 5, wherein the computing device is one of a mobile phone, a smart-phone, a tablet computer, a Personal Digital Assistant (PDA), or any other mobile device, and wherein the camera is a front-facing camera of the computing device.

9. A computer program product for use with a computing device, the computer program product comprising a non-transitory computer readable medium, the non-transitory computer readable medium stores a computer program code for monitoring a worker performing a crowdsourced task being presented on the computing device, the computer program code is executable by one or more processors in the computing device to:
perform at least one of a facial detection processing or an eye tracking processing, on a video stream captured by a camera of the computing device;
determine an inattention instance of the worker, based on at least one of the facial detection processing or the eye tracking processing, wherein the inattention instance corresponds to at least one of an absence of the face of the worker in the captured video stream, the worker looking away from a screen of the computing device for a predetermined time interval, or an eye-blinking rate of the worker not being within a predetermined range;
communicate the determined inattention instance to a crowdsourcing platform to receive an instruction from the crowdsourcing platform for suspension of the crowdsourced task being presented on the computing device, wherein the crowdsourced task is received from the crowdsourcing platform; and
communicate one or more responses to the crowdsourcing platform within a predetermined time interval for one or more sample tasks received from the crowdsourcing platform in an event of the suspension of the crowdsourced task, wherein a performance score of the worker is updated by the crowdsourcing platform based on a count of inattention instances and validation of the one or more responses provided by the worker with predetermined responses.

10. The computer program product of claim 9, wherein the crowdsourced task is a video surveillance task.

11. The computer program product of claim 9, wherein the computing device is one of a mobile phone, a smart-phone, a tablet computer, a Personal Digital Assistant (PDA), or any other mobile device, and wherein the camera is a front-facing camera of the computing device.

12. The method of claim 1 further comprising:
presenting, by the one or more processors, the one or more sample tasks based on an acceptance of the one or more sample tasks by the worker, wherein the one or more sample tasks are received after the suspension of the crowdsourced task being presented on the computing device; and
transmitting, by the one or more processors, one or more responses provided by the worker for the one or more sample tasks to the crowdsourcing platform.

13. The method of claim 1 further comprising receiving, by the one or more processors, a performance report associated with the worker, wherein the performance report of the worker includes at least one of the count of the inattention instances of the worker, a total time interval during which the worker was inattentive, the performance score of the worker, a number of the crowdsourced tasks performed by the worker, a total time spent by the worker on performing crowdsourced tasks, and a remuneration receivable by the worker.

* * * * *